US012649848B2

(12) United States Patent
Komori et al.

(10) Patent No.: US 12,649,848 B2
(45) Date of Patent: Jun. 9, 2026

(54) SEALING APPARATUS

(71) Applicant: NOK CORPORATION, Tokyo (JP)

(72) Inventors: Hiroyuki Komori, Kanagawa (JP);
Yuichi Aoyagi, Kanagawa (JP)

(73) Assignee: NOK CORPORATION (JP)

( * ) Notice: Subject to any disclaimer, the term of this patent is extended or adjusted under 35 U.S.C. 154(b) by 0 days.

(21) Appl. No.: 18/850,905

(22) PCT Filed: Mar. 30, 2023

(86) PCT No.: PCT/JP2023/013081
§ 371 (c)(1),
(2) Date: Sep. 25, 2024

(87) PCT Pub. No.: WO2023/190825
PCT Pub. Date: Oct. 5, 2023

(65) Prior Publication Data
US 2025/0215200 A1 Jul. 3, 2025

(30) Foreign Application Priority Data
Mar. 31, 2022 (JP) ................................. 2022-060434

(51) Int. Cl.
C08L 15/00 (2006.01)
C08L 7/00 (2006.01)
(Continued)
(52) U.S. Cl.
CPC ................. C08L 15/00 (2013.01); C08L 7/00 (2013.01); C09K 3/10 (2013.01); F16J 15/002 (2013.01);
(Continued)
(58) Field of Classification Search
CPC ....... H01M 8/04216; C09K 2200/0607; C09K 2200/0247; C08L 2312/00; C08L 7/00;
(Continued)

(56) References Cited

U.S. PATENT DOCUMENTS 2,862,736 A * 12/1958 Russell .................. F16J 15/166
277/455
5,297,805 A * 3/1994 Merkin .................. F16J 15/022
277/540
(Continued)

FOREIGN PATENT DOCUMENTS

EP 1832787 A1 9/2007
JP H09-229196 A 9/1997
(Continued)

OTHER PUBLICATIONS

Notice of Reasons for Refusal for corresponding Japanese Patent Application No. 2024-512769 dated Jan. 28, 2025, with English translation (12 Pages).

(Continued)

*Primary Examiner* — Eugene G Byrd
(74) *Attorney, Agent, or Firm* — Harness, Dickey & Pierce, P.L.C.

(57) ABSTRACT
A sealing apparatus is provided. The sealing apparatus is arranged between two members facing each other for sealing a space between the two members. The sealing apparatus comprises a sealing body in contact with the space, in which the sealing body has a tensile strength of 10 MPa or more measured in accordance with the provisions of JIS K 6251: 2017, an elongation at break of 200% or more measured in accordance with the provisions of JIS K 6251: 2017, a TR10 temperature of −40° C. or lower in a low-temperature elastic recovery test, measured in accordance with the provisions of JIS K 6261-4: 2017, and a compression set at 100° C. with an elapsed time of 70 hours in a shape of a G25 O-ring as described in the provisions of JIS B 2401-1: 2012, measured in accordance with the provisions of JIS K 6262: 2013, of 40% or less.

10 Claims, 3 Drawing Sheets

(51) Int. Cl.
*C09K 3/10* (2006.01)
*F16J 15/00* (2006.01)
*F16J 15/02* (2006.01)
*H01M 8/04082* (2016.01)

(52) U.S. Cl.
CPC ......... *F16J 15/022* (2013.01); *C08L 2312/00* (2013.01); *C09K 2200/0208* (2013.01); *C09K 2200/0247* (2013.01); *C09K 2200/0607* (2013.01); *H01M 8/04216* (2013.01)

(58) Field of Classification Search
CPC . C08L 15/00; F16J 15/022; F16J 15/02; F16J 15/002

See application file for complete search history.

(56) References Cited

U.S. PATENT DOCUMENTS

| | | | | |
|---|---|---|---|---|
| 6,492,454 | B1 | 12/2002 | Ozawa et al. | |
| 7,942,425 | B2 * | 5/2011 | Shojima | C09K 3/1009 277/914 |
| 8,608,856 | B2 * | 12/2013 | Hayashi | H01L 21/67126 277/944 |
| 11,530,748 | B2 * | 12/2022 | Nobori | F16J 15/104 |
| 11,788,627 | B1 * | 10/2023 | Bernazani | F16J 15/3236 114/330 |
| 2009/0194545 | A1 | 8/2009 | Kamiya et al. | |
| 2012/0326396 | A1 * | 12/2012 | Ajiki | F16J 15/002 277/562 |
| 2016/0122538 | A1 | 5/2016 | Shimizu | |
| 2016/0123471 | A1 * | 5/2016 | Roy | F16J 15/0887 148/677 |
| 2017/0067561 | A1 * | 3/2017 | Alam | F16J 15/002 |
| 2019/0145519 | A1 * | 5/2019 | Eguchi | F16J 15/3276 277/550 |
| 2020/0072354 | A1 * | 3/2020 | Umeda | F16J 15/56 |
| 2020/0087434 | A1 * | 3/2020 | Watanabe | C08C 19/02 |
| 2020/0173560 | A1 * | 6/2020 | Henmi | F16J 15/002 |
| 2020/0309266 | A1 * | 10/2020 | Groweg | E21B 33/10 |
| 2021/0010614 | A1 * | 1/2021 | Buckner | F16K 41/043 |
| 2021/0340837 | A1 * | 11/2021 | Fox | E21B 34/14 |
| 2022/0221057 | A1 * | 7/2022 | Mckay | F16J 15/061 |
| 2022/0381104 | A1 * | 12/2022 | Eldho | E21B 33/1216 |
| 2024/0263001 | A1 * | 8/2024 | Yasuda | C08F 214/22 |

FOREIGN PATENT DOCUMENTS

| | | | |
|---|---|---|---|
| JP | 2008-057711 | A | 3/2008 |
| JP | 2010-165577 | A | 7/2010 |
| JP | 2014-114878 | A | 6/2014 |
| JP | 2016-090050 | A | 5/2016 |
| JP | 2017-075293 | A | 4/2017 |
| JP | 2018-162409 | A | 10/2018 |
| JP | 2019-206663 | A | 12/2019 |

OTHER PUBLICATIONS

International Search Report for corresponding International Application No. PCT/JP2023/013081, mailed May 30, 2023, with English translation (5 Pages).

Written Opinion for corresponding International Application No. PCT/JP2023/013081, mailed May 30, 2023, with English translation (8 Pages).

International Preliminary Report on Patentability for corresponding International Application No. PCT/JP2023/013081, mailed May 30, 2023, with English translation (9 Pages).

Extended European Search Report for corresponding European Patent Application No. 23780833.2 dated Feb. 23, 2026 (11 Pages).

* cited by examiner

SEALING APPARATUS

CROSS REFERENCE TO RELATED APPLICATIONS

This is the National Stage of International Application No. PCT/JP2023/013081, filed Mar. 30, 2023, which claims the benefit of Japanese Patent Application No. 2022-060434 filed Mar. 31, 2022. The contents of these applications are incorporated hereby by reference in their entirety.

BACKGROUND

Technical Field

The present disclosure relates to a sealing apparatus.

Related Art

In October 2020, the Japanese government declared that it would achieve carbon neutrality by 2050, reducing greenhouse gas emissions to zero overall. In terms of raw materials, switching from petroleum resources to plant resources that absorb carbon dioxide can contribute to carbon neutrality. Natural rubber, a plant resource made from tree sap, has excellent mechanical strength and cold resistance, making it useful for applications to materials that require high sealability. Examples of applications in which such characteristics of natural rubber can be utilized include a hydrogen sealing material.

In a hydrogen society, which is expected to be a means of decarbonization, carbon dioxide is not emitted upon use of energy. Hydrogen stations and fuel cell vehicles have already been put into practical use in order to realize a hydrogen society, but there is a demand for sealing technology that can safely manage hydrogen without leaks at high pressures and over a wide temperature range. Therefore, combinations of hydrogen applications and natural rubber are expected to bring about a synergistic decarbonization effect, and to inhibit cracking under high pressures in sealing products and improve elasticity reduction (cold resistance) at low temperatures.

However, diene-based rubbers such as natural rubber are generally prone to thermal degradation. When natural rubber is exposed to high-temperature air in a compressed state for a long period of time, stress relaxation occurs due to oxidative decomposition, and permanent deformation remains following compression release. This phenomenon is fatal to sealing products in which fluid is sealed with use of the restoring force of the rubber, as a result of which in order to apply natural rubber to hydrogen sealing materials, it is necessary to improve resistance to compression set in high-temperature air.

Japanese Patent Application Laid-Open No. 2008-57711 describes a sealing material for high-pressure hydrogen containers in fuel cell vehicles that can withstand fluctuation in pressure or temperature, and exemplifies natural rubber as one type of applicable rubber. However, since Japanese Patent Application Laid-Open No. 2008-57711 targets sealability in a high-temperature hydrogen atmosphere rather than a high-temperature air atmosphere, the literature does not describe improvement in resistance to compression set of natural rubber in high-temperature air. Moreover, the exposure time to high-temperature hydrogen gas is relatively short, for example, one hour, and furthermore, the literature does not describe any compounding information for rubber materials that can achieve the desired performance.

Therefore, it is necessary to investigate a sealing material made of natural rubber that has high mechanical strength under high pressures, excellent cold resistance, and can further exhibit excellent resistance to compression set in high-temperature air for a long period of time.

The present disclosure provides a sealing apparatus that exhibits high mechanical strength under high pressures, and further has excellent cold resistance in low temperature ranges and resistance to compression set in high temperature ranges.

SUMMARY

The sealing apparatus according to an embodiment of the present disclosure is a sealing apparatus arranged between two members facing each other for sealing a space between the two members, wherein the sealing apparatus comprises a sealing body in contact with the space, and wherein the sealing body has a tensile strength of 10 MPa or more measured in accordance with the provisions of JIS K 6251: 2017, an elongation at break of 200% or more measured in accordance with the provisions of JIS K 6251: 2017, a TR10 temperature of −40° C. or lower, measured in accordance with the provisions of JIS K 6261-4: 2017 in a low-temperature elastic recovery test, and a compression set at 100° C. with an elapsed time of 70 hours in a shape of a G25 O-ring as described in the provisions of JIS B 2401-1: 2012, measured in accordance with the provisions of JIS K 6262: 2013, of 40% or less.

In an embodiment of the present disclosure, the sealing body is annular.

In an embodiment of the present disclosure, the sealing body is held by a backup ring.

In an embodiment of the present disclosure, a cross-sectional shape of the sealing body is a projecting shape.

In an embodiment of the present disclosure, the sealing body is arranged on a plate-like substrate, and the substrate is a plate made of metal or carbon.

In an embodiment of the present disclosure, the substrate and the sealing body are bonded by an adhesive contained in the sealing body.

In an embodiment of the present disclosure, the sealing body is in contact with hydrogen gas.

In an embodiment of the present disclosure, the sealing body is in contact with liquid hydrogen.

In an embodiment of the present disclosure, the sealing apparatus is a sealing apparatus for use in a hydrogen energy system.

The sealing apparatus according to another embodiment of the present disclosure is a sealing apparatus arranged between two members facing each other for sealing a space between the two members, wherein the sealing apparatus comprises a sealing body in contact with the space, and wherein the sealing body is a vulcanized molded product of a rubber composition comprising (A) a natural rubber component selected from natural rubber and epoxy-modified natural rubber having an epoxidation degree of 1% or more and less than 50%, (B) a filler selected from carbon black and silica, (C) an organic peroxide-based crosslinking agent, and optionally (D) a silane coupling agent, provided that when the filler is carbon black, the rubber composition comprises epoxy-modified natural rubber having an epoxidation degree of 1% or more and less than 50%, and when the filler is silica, the rubber composition further comprises a silane coupling agent.

In an embodiment of the present disclosure, the rubber composition further comprises (E) at least one additive selected from the group consisting of a crosslinking accelerator, an auxiliary, and an anti-aging agent.

Effects of Disclosure

According to the present disclosure, a sealing apparatus that exhibits high mechanical strength under high pressures, and further has excellent cold resistance in low temperature ranges and resistance to compression set in high temperature ranges, is provided.

DETAILED DESCRIPTION

Figure 1:
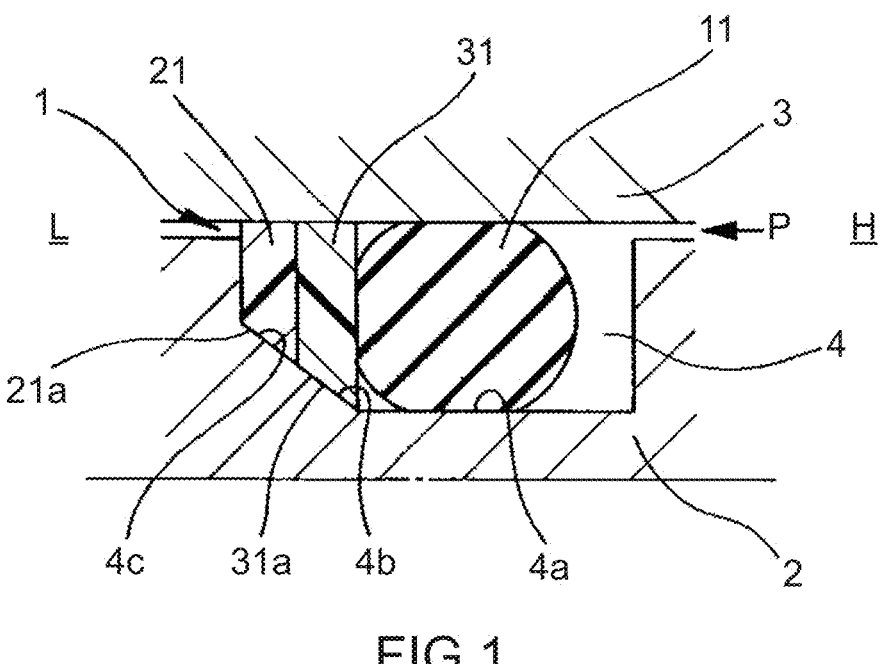
FIG. 1 is a cross sectional view of a main portion of the sealing apparatus according to an embodiment of the present disclosure.

Hereinafter, the sealing apparatus according to an embodiment of the present disclosure will be described with referring to the drawings. Incidentally, the room temperature described below shall be within a range of 23° C.±2° C.

<Sealing Apparatus>

The sealing apparatus according to the present embodiment is a sealing apparatus arranged between two members facing each other for sealing a space between the two members, and comprises a sealing body in contact with the space. The sealing apparatus according to the present embodiment is preferably used in a hydrogen energy system, in which the sealing body is in contact with hydrogen gas or liquid hydrogen, and the sealing apparatus is used as a hydrogen gas seal or liquid hydrogen seal.

First Embodiment

FIG. 1 shows an example of an embodiment of the sealing apparatus comprising such a sealing body. A sealing apparatus 1 shown in FIG. 1 is mounted in a mounting groove 4 (mounting portion) arranged in one member 2 of two members 2 and 3 facing each other and is in close contact with the other member 3, thereby sealing between the two members 2 and 3. The sealing apparatus 1 has a sealing ring 11 (ring packing made of rubber) made of rubbery elastic body, a first backup ring 21 (backup ring) arranged on a low-pressure side L of the sealing ring 11, and a second backup ring 31 arranged between the sealing ring 11 and the first backup ring 21. The two members 2 and 3 are, for example, high-pressure hydrogen pipes for a fuel cell, which are connected to each other, and on an outer peripheral side of a seal housing portion in one piping member 2, a seal housing portion of the other piping member 3 is arranged, and the sealing apparatus 1 is mounted in the annular mounting groove 4 arranged on the outer peripheral side of the seal housing portion of the piping member 2, and is in close contact with an inner peripheral surface of the seal housing portion of the other piping member 3. Sealed fluid is high-pressure hydrogen gas which attempts to flow from a high-pressure side H to the low-pressure side L.

The first backup ring 21 for use is a backup ring made of nylon (product name). Nylon is one of resin materials, which is difficult for gas to pass through. The second backup ring 31 for use is a backup ring made of a material that is softer than the first backup ring 21, such as a PTFE resin. For both backup rings 21 and 31, rings with ends are often used, in which one location on the circumference is cut in order to be easily incorporated, but when gas leakage is taken into consideration, they are preferably endless types without a cut.

The sealing ring 11 corresponds to a sealing body of the sealing apparatus according to the present disclosure. The sealing ring 11 is annularly formed, and is held by the first and second backup rings 21 and 31. A material of the sealing ring 11 is the same as the material that forms the sealing body, which will be described later, and the sealing ring 11 exhibits the characteristics of the sealing body, which will be described later.

The mounting groove 4 is basically formed as a space with a rectangular cross section, but a high-pressure side mounting part 4a for mounting the sealing ring 11 at the bottom of the groove, is formed as a flat surface forming a cylindrical surface. Also a low-pressure side mounting part 4b for mounting the first and second backup rings 21 and 31, which is continuous along with the low-pressure side L of the high-pressure side mounting part 4a, is formed as an inclined surface forming a conical surface so that a gap (gap in the radial direction) between the two members 2 and 3 gradually narrows from the high-pressure side H to the low-pressure side L, i.e., so that a depth of the mounting groove 4 gradually becomes shallower, and is formed as an inclined bottom surface 4c.

Also the first and second backup rings 21 and 31 mounted on the low-pressure side mounting part 4b are each basically formed in a rectangular cross sectional shape, but its inner peripheral surface, corresponding to the inclined bottom surface 4c, is formed as an inclined surface forming a conical surface so that the inner diameter dimension gradually increases from the high pressure side H to the low pressure side L, and is formed as inclined surfaces 21a and 31a.

In the sealing apparatus 1 having such a configuration, when pressure P acts from the right-hand side of FIG. 1, the sealing ring 11 is pressed against the second backup ring 31 on the low pressure side, but this second backup ring 31 is made of a PTFE resin, which is softer than the first backup ring 21 made of nylon. Therefore, it is designed to be possible to inhibit the sealing ring 11 from being repeatedly pressed against the hard material and being damaged upon generation of alternating pressure or the like. Also the second backup ring 31 that is made of a PTFE resin, which is a soft material, is prone to projection, but the first backup ring 21 that is made of nylon, which is a hard material, prevents projection.

The mounting groove 4 is also arranged with the inclined bottom surface 4c that gradually narrows a gap between the two members 2 and 3 from the high pressure side H to the low pressure side L, and both backup rings 21 and 31 are arranged with the inclined surfaces 21a and 31a, respectively, corresponding to the inclined bottom surface 4c on their inner peripheral surfaces. Therefore, when a sealed fluid pressure acts on both backup rings 21 and 31 via the sealing ring 11, both backup rings 21 and 31 are compressed in a manner to be forced into a narrow space and come into strong, intimate contact with the mating surfaces. As a result, there occurs a phenomenon whereby both backup rings 21 and 31 are compressed due to the inclined surfaces 21a and 31a, making it possible to expect not only that the sealing ring 11 is further less likely to project, but also that when the sealing ring 11 alone cannot seal high-pressure hydrogen gas that is sealed fluid, the backup rings 21 and 31 can seal it.

The backup ring 21 is also formed of nylon, which is difficult for gas to permeate. Therefore, from this point of view as well, it can be expected that leakage whereby high-pressure hydrogen gas that is sealed fluid permeates the backup ring 21, will be effectively reduced. Furthermore, since a width dimension in the radial direction of the backup ring 21 is smaller than a width dimension in the radial direction of the second backup ring 31, the permeation area is set small. Therefore, from this point of view as well, it is possible to effectively seal the high-pressure hydrogen gas, which is sealed fluid.

Figure 2:
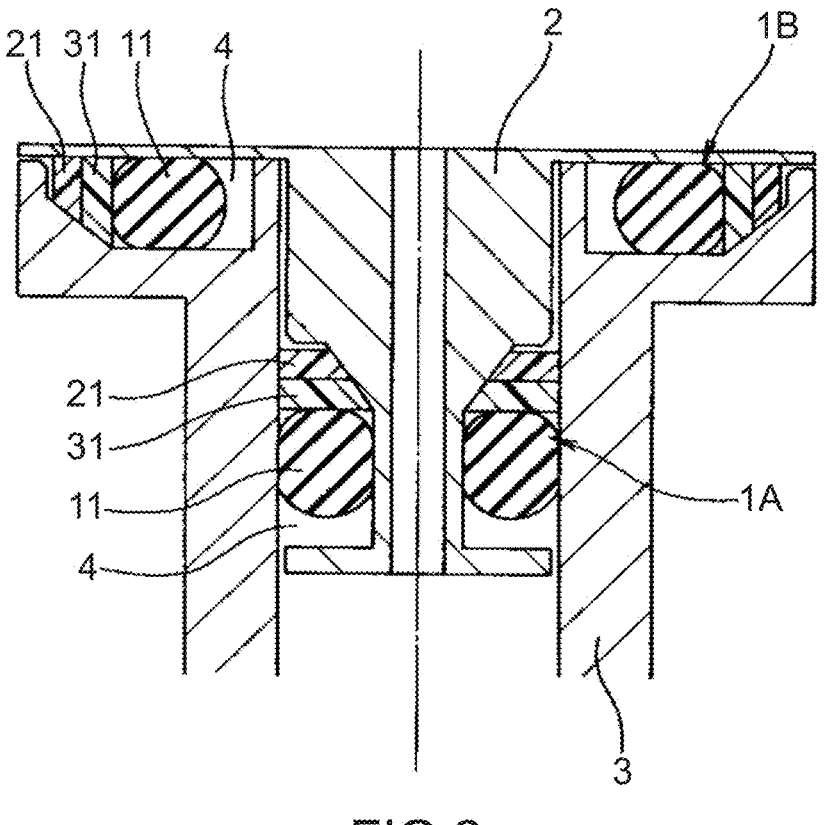
FIG. 2 is a cross sectional view of the sealing apparatus according to another embodiment of the present disclosure, for the sealing apparatus shown in FIG. 1.

The sealing apparatus 1 according to the present embodiment may also be used not only for a cylindrical gap between the two members, but also for a flat gap, i.e., a gap between end faces. FIG. 2 shows an example of the embodiment of such a sealing apparatus. In a lower sealing apparatus 1A in FIG. 2, the first backup ring 21 or second backup ring 31 is aligned in the axial direction in order to seal a cylindrical gap between one piping member 2 and the other piping member 3, while in an upper sealing apparatus 1B in FIG. 2, the first backup ring 21 or second backup ring 31 is aligned in the radial direction in order to seal a flat gap between one piping member 2 and the other piping member 3. Arranging them in such a double manner further enables reducing leakage to the outside.

Second Embodiment

Figure 3:
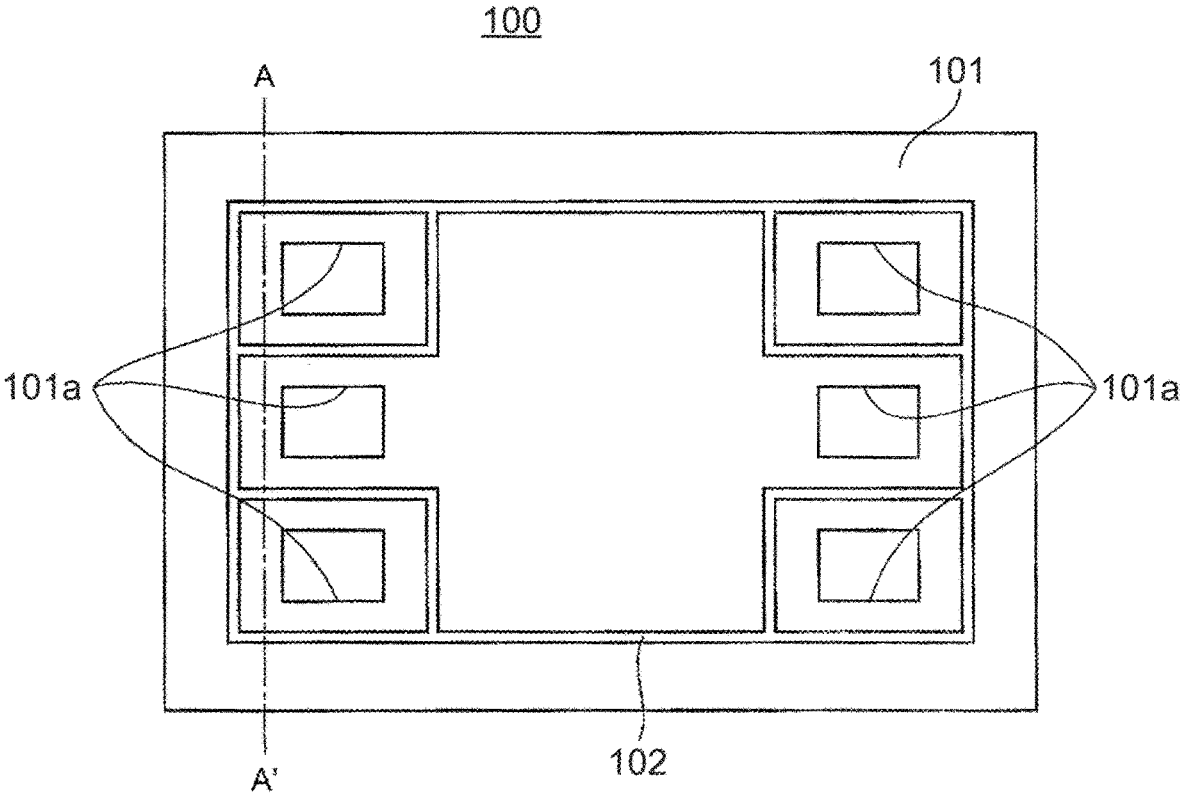
FIG. 3 is a schematic view of the sealing apparatus according to another embodiment of the present disclosure.

FIG. 3 shows an example of the sealing apparatus according to another embodiment of the present disclosure. A sealing apparatus 100 shown in FIG. 3 is a sealing member for a separator that is stacked on both sides of an electrolyte membrane/electrode assembly (hereinafter referred to as MEA) in a general fuel cell, i.e., a cell seal for a fuel cell. Such a cell seal for a fuel cell is arranged between a separator and an MEA, which are two members facing each other to tightly seal a space between the separator and MEA (not shown). A separator of a fuel cell needs to supply fluid for a fuel cell (fuel gas containing hydrogen, oxidant gas containing oxygen, and the like) to MEA without leakage to the outside, and an endless gasket serves to seal such fluid for a fuel cell within a space surrounded by the gasket.

Figure 4:
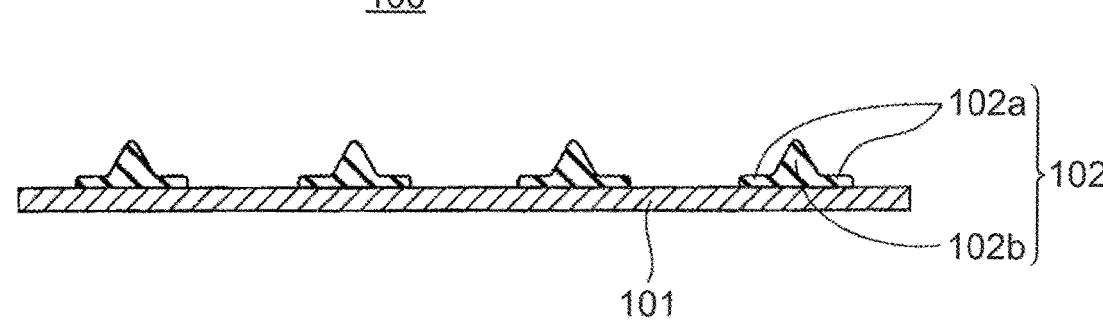
FIG. 4 is a schematic cross sectional view of the sealing apparatus shown in FIG. 3.

In the sealing apparatus 100 shown in FIG. 3, an endless gasket 102 that is made of elastic material and extends along a surface of a substrate 101, is formed around a ventilation hole 101a on a surface of the plate-like substrate 101. FIG. 4 shows a schematic cross section of the sealing apparatus 100 along a line AA' in FIG. 3, in which a gasket 102 is formed with four projecting portions that project from the surface of the substrate 101. As shown in FIG. 4, the gasket 102 has a base portion 102a bonded to the surface of the substrate 101 and a seal lip portion 102b projecting in a mountain shape from the base portion 102a. Note that, on the line AA' in FIG. 3, there is a location (not shown) through which a molding material of the gasket 102 flows in and out upon molding of the gasket 102.

The substrate 101 which is, for example, a thin plate including a metal plate such as stainless steel, a carbon plate or the like is used. The substrate 101 and the gasket 102 are bonded via an adhesive layer or by an adhesive contained in the gasket 102. Also the sealing apparatus 100 may be an integrally molded cell seal in which a surface of the plate-like substrate 101 is integrally molded with the endless gasket 102 made of elastic material and extending along the surface of the substrate 101. The substrate 101 of such an integrally molded cell seal is a member included in a cell structure of a fuel cell that is integrally molded with the gasket 102, and examples of the substrate 101 include a separator, MEA, a gas diffusion layer (GDL), and the like.

The gasket 102 corresponds to the sealing body of the sealing apparatus according to the present disclosure. As shown in FIG. 4, the cross-sectional shape of the gasket 102 is a projecting shape. A material of the gasket 102 is the same as the material that forms the sealing body, which will be described later, and the gasket 102 exhibits the characteristics of the sealing body, which will be described later.

<Sealing Body>

The sealing body of the sealing apparatus according to the present embodiment is a vulcanized molded product of a rubber composition containing (A) a natural rubber component selected from natural rubber and epoxy-modified natural rubber having an epoxidation degree of 1% or more and less than 50%, (B) a filler selected from carbon black and silica, (C) an organic peroxide-based crosslinking agent, and optionally (D) a silane coupling agent, provided that when the filler is carbon black, the rubber composition contains epoxy-modified natural rubber having an epoxidation degree of 1% or more and less than 50%, and when the filler is silica, the rubber composition further contains a silane coupling agent. Natural rubber is believed to undergo an oxidative decomposition reaction starting from a diene structure (C=C bond) under a high-temperature air atmosphere. Therefore, in a rubber composition containing a natural rubber component filled with carbon black, use of appropriately epoxidized natural rubber inhibits compression set and enables improving resistance to compression set in high-temperature air. Further adding a silane coupling agent to a rubber composition containing a natural rubber component filled with silica enables improving the resistance to compression set in high-temperature air while maintaining excellent cold resistance, even though the natural rubber is not epoxidized.

In such a manner, even though natural rubber is used as a main raw material, using the specific rubber composition described above upon fabrication of sealing body makes it possible to obtain a sealing body that is less likely to crack even under high pressures, has high elastic recovery even in low temperature ranges, and has small compression set at high temperature ranges, which are all characteristics required for a hydrogen sealing material, as a result of which it is possible to realize a sealing apparatus that exhibits high mechanical strength under high pressures, and further has excellent cold resistance at low temperature ranges and resistance to compression set at high temperature ranges.

A shape of the sealing body is not particularly limited, and can be formed into any shape depending on its application. For example, it may be a sealing member in sheet form with a cross-sectional shape of a square, rectangle, disk, or the like, or an annular sealing member such as an O-ring or a square ring, and these annular portions may be formed in a portion of the sealing body.

(A) Natural Rubber Component

The natural rubber component for use is natural rubber that has not been chemically modified at all, or natural rubber that has been epoxy-modified with a diene portion having an epoxidation degree of 1% or more and less than 50%. Natural rubber is rubber refined from sap (latex) of natural trees, and is diene-based rubber that is different from synthetic rubber that was chemically synthesized using petroleum, naphtha, and the like as raw materials. A diene portion of the natural rubber can be epoxidized by a reaction between formic acid and hydrogen peroxide solution. The epoxy-modified natural rubber has an epoxidation degree of 1% or more and less than 50%, preferably has an epoxidation degree of 10% or more and 40% or less, and more preferably has an epoxidation degree of 20% or more and 30% or less.

The natural rubber and the epoxy-modified natural rubber may be used singly or in combinations of two or more thereof. Using such natural rubber enables improving the mechanical properties of the sealing body. Also the natural rubber and epoxy-modified natural rubber may be commercially available products. Examples of the commercially available natural rubber and epoxy-modified natural rubber include natural rubber "RSS No. 1" (imported product of TOYOTSU CHEMIPLAS CORPORATION), natural rubber having an epoxidation degree of 25% "ENR25" (imported product of Sanyo Trading Co., Ltd.).

(B) Filler

The rubber composition is compounded with a filler. The filler contained in the rubber composition can improve the mechanical strength and compression set of the resulting vulcanizate. As the filler, carbon black and silica, which are common reinforcing materials, are used. The fillers may be used singly or in combinations of two or more thereof.

Carbon black can be appropriately selected from known materials, for example, hard carbon such as Super Abrasion Furnace (SAF) carbon black, Intermediate Super Abrasion Furnace (ISAF) carbon black, High Abrasion Furnace (HAF) carbon black, and Easy Processing Channel (EPC) carbon black, as well as soft carbon such as extra Conductive Furnace (XCF) carbon black, Fast Extruding Furnace (FEF) carbon black, General Purpose Furnace (GPF) carbon black, High Modulus Furnace (HMF) carbon black, Semi-Reinforcing Furnace (SRF) carbon black, Fine Thermal (FT) carbon black, and Medium Thermal (MT) carbon black. Examples of commercially available carbon black include "Vulcan (registered trademark) 3L" (HAF carbon) manufactured by Cabot Corporation and the like. The content of carbon black is not particularly limited, but is preferably 1 part by mass or more and 100 parts by mass or less, and more preferably 25 parts by mass or more and 75 parts by mass or less, relative to 100 parts by mass of the natural rubber component. The carbon black may be used singly or in combinations of two or more thereof.

Silica may be appropriately selected from any known material, but it preferably has favorable kneading workability. Examples of commonly used silica include dry-process silica produced by a thermal decomposition method of halogenated silicic acid or organic silicon compounds, or by a method for heating and reducing silica sand and oxidizing vaporized SiO with air, or the like, and wet-process silica produced by a thermal decomposition method of sodium silicate, or the like. Examples of commercially available silica products include, for example, "Ultrasil (registered trademark) 360" manufactured by Evonik Japan Co., Ltd., and the like. The content of silica is not particularly limited, but is preferably 1 part by mass or more and 100 parts by mass or less, and more preferably 25 parts by mass or more and 75 parts by mass or less, relative to 100 parts by mass of the natural rubber component. The silica may be used singly or in combinations of two or more thereof.

(C) Organic Peroxide-Based Crosslinking Agent

The organic peroxide-based crosslinking agent is used as a crosslinking agent that forms a peroxide crosslink of the natural rubber component. By using the organic peroxide-based crosslinking agent as the crosslinking agent, excellent resistance to compression set is imparted to the sealing body. Examples of the organic peroxide-based crosslinking agents include, for example, dicumyl peroxide, cumene hydroperoxide, p-methane hydroperoxide, 2,5-dimethylhexane-2,5-dihydroperoxide, di-tert-butyl peroxide, benzoyl peroxide, m-toluyl peroxide, 2,5-dimethyl-2,5-bis(tert-butylperoxy)hexane, 2,5-dimethyl-2,5-bis(tert-butylperoxy)-3-hexyne, 1,3-bis(tert-butylperoxyisopropyl)benzene, 2,5-dimethyl-2,5-di(benzoylperoxy)hexane, 1,1,3,3-tetramethylbutylperoxy-2-ethylhexanoate, tert-butylperoxybenzoate, tert-butylperoxylaurate, di(tert-butylperoxy)adipate, di(2-ethoxyethylperoxy)dicarbonate, bis(4-tert-butylcyclohexyl) peroxydicarbonate, and the like. Among these, dicumyl peroxide is preferred.

As a commercially available organic peroxide-based crosslinking agent, for example, "Percumyl (registered trademark) D" manufactured by NOF CORPORATION and the like can be used. The content of the organic peroxide-based crosslinking agent is preferably 0.1 parts by mass or more and 10 parts by mass or less, and more preferably 1 part by mass or more and 5 parts by mass or less, relative to 100 parts by mass of the natural rubber component. The organic peroxide-based crosslinking agent may be used singly or in combinations of two or more thereof.

(D) Silane Coupling

When the rubber composition contains silica as a filler, a silane coupling agent is further compounded into the rubber composition. As the silane coupling agent, preferred is a silane coupling agent having a mercapto group, for example, 3-mercaptopropyltrimethoxysilane, 3-mercaptopropyltriethoxysilane, 3-mercaptopropyldiethoxymethoxysilane, 3-mercaptopropyltripropoxysilane, 3-mercaptopropyldipropoxymethoxysilane, 3-mercaptopropyltributoxysilane, 3-mercaptopropyldibutoxymethoxysilane, 3-mercaptopropylmethyldimethoxysilane, 3-mercaptopropyldimethylmethoxysilane, 3-mercaptopropylmethyldiethoxysilane, 3-mercaptopropyldimethylethoxysilane, 3-mercaptopropylmethyldipropoxysilane, 3-mercaptopropylpropoxydimethylsilane, 3-mercaptopropylmethyldiisopropoxysilane, 3-mercaptopropylisopropoxydimethylsilane, 3-mercaptopropylmethyldibutoxysilane, 3-mercaptopropyldimethylbutoxysilane, 2-mercaptoethyltrimethoxysilane, 2-mercaptoethyltriethoxysilane, mercaptomethyltrimethoxysilane, mercaptomethyltriethoxysilane, and the like.

As a commercially available silane coupling agent, for example, "KBM-803" manufactured by Shin-Etsu Chemical Co., Ltd. and the like can be used. The content of the silane coupling agent is preferably 0.1 parts by mass or more and 10 parts by mass or less and more preferably 1 part by mass or more and 5 parts by mass or less, relative to 100 parts by mass of the natural rubber component. The silane coupling agent may be used singly or in combinations of two or more thereof.

(E) Other Additives

The rubber composition may contain other compounding components in addition to the above-described components, if necessary. Examples of the other compounding components include various additives such as a crosslinking accelerator, a plasticizer, an anti-aging agent, an auxiliary agent, a slip agent, an adhesive, lubricant, a flame retardant, a fungicide, and an antistatic agent. These additives may be used singly or in combinations of two or more thereof. Also, the compounding amount of these additives is not particularly limited as long as it does not impede the purpose and effect of the present disclosure, and an appropriate amount according to the compounding purpose can be compounded.

<Production Method of the Sealing Body>

The method for producing the sealing body is not particularly limited, and may be a method that includes, for example, appropriately compounding the above-described natural rubber component, filler, and organic peroxide-based crosslinking agent, as well as a silane coupling agent and various optional additives, which are compounded, if necessary, in a predetermined ratio, and then kneading them by using a kneading machine such as a single-screw extruder, a twin-screw extruder, a roll, a Banbury mixer, a kneader, or a high-shear mixer to produce a rubber composition. Note that, before kneading, mastication, pre-kneading, or the like may be performed if necessary.

Furthermore, the obtained rubber composition undergoes vulcanization molding to be able to produce a vulcanized molded product having a shape of the sealing body. The vulcanization molding of the rubber composition is generally performed by pressurized vulcanization at about 150 to 230° C. for approximately 0.5 to 30 minutes using an injection molding machine, a compression molding machine, or the like. After undergoing such primary vulcanization (pressurized vulcanization), the rubber composition may also undergo secondary vulcanization, if necessary, in order to ensure that an inside of the vulcanized molded product is also vulcanized. The secondary vulcanization can generally be carried out by heating the rubber composition in an oven, or by steam heating, hot air heating, or the like at about 150 to 250° C. for approximately 0.5 to 24 hours.

(Mechanical Strength)

The sealing body of the sealing apparatus according to the present embodiment has a tensile strength (tensile strength measured under the conditions of test specimen shape: dumbbell-shaped No. 6, rate: 500 mm/min, distance between marked lines: 20±0.5 mm, atmosphere: air, test temperature: room temperature), measured in accordance with the provisions of JIS K6251:2017 (the Japanese Industrial Standards created by modifying the technical content based on ISO37 (5th edition, 2011)), of 10 MPa or more and preferably 15 MPa or more. Also the sealing body has an elongation at break (elongation at break measured under the conditions of test specimen shape: dumbbell-shaped No. 6, rate: 500 mm/min, distance between marked lines: 20±0.5 mm, atmosphere: air, test temperature: room temperature), measured in accordance with the provisions of JIS K6251: 2017, of 200% or more and preferably 300% or more. The sealing body having a tensile strength of 10 MPa or more and an elongation at break of 200% or more can provide a sealing apparatus comprising a sealing body that exhibits high mechanical strength even under high pressures.

(Cold Resistance)

The sealing body of the sealing apparatus according to the present embodiment has a TR10 temperature in a low-temperature elastic recovery test (TR test) (TR10 temperature measured in the low-temperature elastic recovery test (TR test) under the conditions of test specimen shape: I-shaped as described in the provisions of JIS K6261-4: 2017, heat medium: ethanol, test temperature: −70° C. to 23° C.), measured in accordance with the provisions of JIS K6261-4: 2017 (the Japanese Industrial Standards created by modifying the technical content based on ISO2921 (5th edition, 2011)), of −40° C. or lower and preferably −60° C. or lower. The temperature at TR10 is −40° C. or lower, enables providing a sealing apparatus comprising a sealing body that has excellent cold resistance in low temperature ranges.

(Resistance to Compression Set)

The sealing body of the sealing apparatus according to the present embodiment has a compression set at 100° C. with an elapsed time of 70 hours in a shape of G25 O-ring described in the provisions of JIS B 2401-1: 2012 (Japanese Industrial Standards created by modifying the technical content based on ISO3601-1 (4th edition, 2008)) (compression set measured under the conditions of compression plate: smooth stainless steel plate, test specimen shape: G25 O-ring as described in the provisions of JIS B 2401-1: 2012, spacer thickness: 2.30 mm, compression rate: 25%, atmosphere: air, test temperature: 100° C., exposure time: 70 hours, conditions when left stand after release: room temperature for 30 minutes), measured in accordance with the provisions of JIS K 6262:2013 (the Japanese Industrial Standards created by modifying the technical content based on ISO815-1 and ISO815-2 (both 1st editions, 2008)), of 40% or less and preferably 35% or less. The compression set under such conditions of 40% or less enables providing a sealing apparatus comprising a sealing body that has excellent resistance to compression set at high temperature ranges.

Based on the above-described embodiments, the present disclosure relates to the following [1] to [7].

[1]

A sealing apparatus arranged between two members facing each other for sealing a space between the two members,
    wherein the sealing apparatus comprises a sealing body in contact with the space,
    and in that the sealing body has a tensile strength of 10 MPa or more measured in accordance with the provisions of JIS K 6251: 2017, an elongation at break of 200% or more measured in accordance with the provisions of JIS K 6251: 2017, a TR10 temperature of −40° C. or lower, measured in accordance with the provisions of JIS K 6261-4:2017 in a low-temperature elastic recovery test, and a compression set at 100° C. with an elapsed time of 70 hours in a shape of a G25 O-ring as described in the provisions of JIS B 2401-1: 2012, measured in accordance with the provisions of JIS K 6262: 2013, of 40% or less.

[2]

The sealing apparatus according to [1] above, wherein the sealing body is annular.

[3]

The sealing apparatus according to [1] or [2] above, wherein the sealing body is held by a backup ring.

[4]

The sealing apparatus according to [1] above, wherein a cross-sectional shape of the sealing body is a projecting shape.

[5]

The sealing apparatus according to [4] above, wherein the sealing body is arranged on a plate-like substrate, and the substrate is a plate made of metal or carbon.

[6]

The sealing apparatus according to [5] above, wherein the substrate and the sealing body are bonded by an adhesive comprised in the sealing body.

[7]

The sealing apparatus according to any one of [1] to [6] above, wherein the sealing body is in contact with hydrogen gas.

[8]

The sealing apparatus according to any one of [1] to [6] above, wherein the sealing body is in contact with liquid hydrogen.

[9]

The sealing apparatus according to any one of [1] to [8] above, wherein the sealing apparatus is for use in a hydrogen energy system.

[10]

A sealing apparatus arranged between two members facing each other for sealing a space between the two members, wherein the sealing apparatus comprises a sealing body in contact with the space, and in that the sealing body is a vulcanized molded product of a rubber composition comprising (A) a natural rubber component selected from natural rubber and epoxy-modified natural rubber having an epoxidation degree of 1% or more and less than 50%, (B) a filler selected from carbon black and silica, (C) an organic peroxide-based crosslinking agent, and optionally (D) a silane coupling agent, provided that when the filler is carbon black, the rubber composition comprises epoxy-modified natural rubber having an epoxidation degree of 1% or more and less than 50%, and when the filler is silica, the rubber composition further comprises a silane coupling agent.

[11]

The sealing apparatus according to above, wherein the rubber composition further comprises (E) at least one additive selected from the group consisting of a crosslinking accelerator, an auxiliary, and an anti-aging agent.

Thus, the embodiments of the present disclosure were described above, but the present disclosure is not limited to the above embodiments, includes all aspects included in the concept of the present disclosure and the scope of the claims, and can be modified in various ways within the scope of the present disclosure.

EXAMPLES

Next, Examples of the present disclosure will be described, but the present disclosure is not limited to these Examples.

Example 1

100 parts by mass of natural rubber having an epoxidation degree of 25% ("ENR25", imported product of Sanyo Trading Co., Ltd.) was fed in a kneading extrusion apparatus ("Labo Plastomill 30C150", manufactured by TOYO SEIKI CO., LTD.) and masticated at 50° C. for 15 minutes. Thereafter, 50 parts by mass of a filler A (carbon black: product name "Vulcan (registered trademark) 3L", manufactured by Cabot Japan K. K.), 2.5 parts by mass of a crosslinking agent A (dicumyl peroxide: product name "Percumyl (registered trademark) D", manufactured by NOF CORPORATION), 5 parts by mass of an auxiliary agent A (zinc oxide: product name "Zinc Oxide", manufactured by Seido Chemical Industry Co., Ltd.), 1 part by mass of an auxiliary agent B (stearic acid: product name "DTST", manufactured by Miyoshi Oil & Fat Co., Ltd.), and further 2 parts by mass of an anti-aging agent (2,2,4-trimethyl-1,2-dihydroquinoline polymer: product name "Nocrac 224", manufactured by OUCHI SHINKO CHEMICAL INDUSTRY CO., LTD.) were fed and the mixture was kneaded at 50° C. for 15 minutes to fabricate a rubber dough. Next, the obtained rubber dough was fed into a roll kneader ("LABORTORY MILL", manufactured by Kansai Roll Co., Ltd.), and passed therethrough with a roll gap of 1.5 to 2.5 mm five times followed by being passed therethrough with a roll gap of 1 mm ten times to fabricate a rubber composition.

<Fabrication of Test Piece for Measuring Mechanical Strength and Cold Resistance>

The rubber composition obtained was crosslinked by hot press at 170° C. using a press machine ("80 TON PRESS", manufactured by Hokutan Kikai Kogyo Kabushiki Kaisha), and was crosslinked for a time 1.5 times a t90 (90% crosslinked time) to undergo pressurized vulcanization (primary vulcanization) and to fabricate a test piece A.

<Fabrication of Test Piece for Measuring Compression Set>

The rubber composition obtained was crosslinked by hot press at 170° C. using a press machine ("50 TON KV PRESS", manufactured by KODAISHOJI Co., LTD.), and was crosslinked for a time 1.5 times a t90 (90% crosslinked time) to undergo pressurized vulcanization (primary vulcanization) and to fabricate a test piece B.

<Tensile Strength and Elongation at Break>

The tensile strength and elongation at break of the test piece A were measured using a tensile tester (Strograph (registered trademark) AE, manufactured by Toyo Seiki Seisaku-sho, Ltd.) under the following test conditions in accordance with the provisions of JIS K 6251: 2017. The results are shown in Table 1.

[Test Conditions]

Test specimen shape: Dumbbell No. 6

Figure 5:
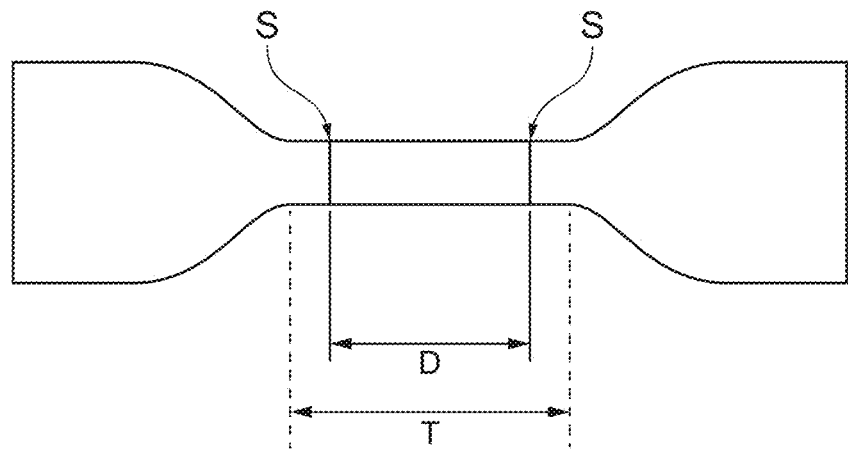
FIG. 5 is a schematic view illustrating a shape of a test specimen fabricated when measuring mechanical strength using test pieces A obtained in Examples and Comparative Examples.

(the test specimen is dumbbell-shaped as shown in FIG. 5, where S is a marked line, D is an initial distance between the marked lines, and T is a parallel portion. For the dumbbell No. 6, D=20±0.5 mm, and a thickness of T=2.0±0.2 mm.)

Rate: 500 mm/min

Atmosphere: Air

Test temperature: Room temperature

<Cold Resistance>

The test piece A underwent a low-temperature elastic recovery test (TR test) under the following test conditions in accordance with the provisions of JIS K6261-4: 2017 using a TR tester "No. 145-L", manufactured by YASUDA SEIKI SEISAKUSHO, LTD.), and a temperature at TR10 was measured. The results are shown in Table 1.

[Test Conditions]

Test specimen shape: I-shape as described in the provisions of JIS K6261-4: 2017

Heat medium: Ethanol

Test temperature: −70° C. to 23° C.

<Resistance to Compression Set>

For the test piece B, a compression set was measured under the following test conditions in accordance with the provisions of JIS K 6262: 2013. The results are shown in Table 1.

[Test Conditions]

Compression plate: Smooth stainless steel plate

Specimen shape: G25 O-ring as described in the provisions of JIS B 2401-1: 2012

Figure 6:
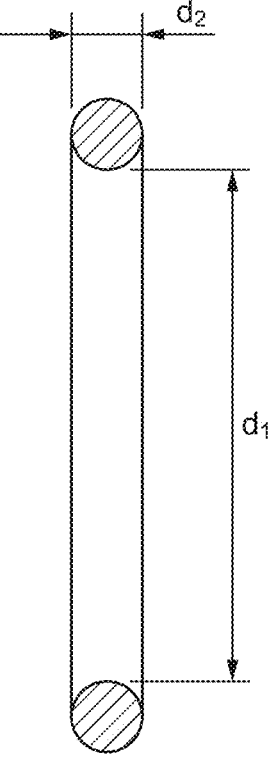
FIG. 6 is a schematic view illustrating a cross section of a test specimen fabricated when measuring compression set using test pieces B obtained in Examples and Comparative Examples.

(FIG. 6 is a schematic view illustrating the cross section of the O-ring used in the test specimen, where $d_1$ is an inner diameter and $d_2$ is a thickness. For the G25 O-ring, $d_1$=24.4±0.25 mm, $d_2$=3.1±0.10 mm.)

13

Spacer thickness: 2.30 mm
Compression rate: 25%
Atmosphere: Air
Test temperature: 100° C.
Exposure time: 70 hours
Conditions when left stand after release: 30 minutes at room temperature

Example 2

A rubber composition and respective test pieces A and B were fabricated in the same manner as in Example 1, except that natural rubber ("RSS No. 1", imported product of TOYOTSU CHEMIPLAS CORPORATION) was used instead of natural rubber having an epoxidation degree of 25%, a filler B (silica: trade name "Ultrasil (registered trademark) 360", manufactured by Evonik Japan Co., Ltd.) was used instead of the filler A, and 1 part by mass of a silane coupling agent (mercapto group-containing silane coupling agent: trade name "KBM-803", manufactured by Shin-Etsu Chemical Co., Ltd.) was further compounded, and then the above measurements were made. The results are shown in Table 1.

Comparative Example 1

A rubber composition and respective test pieces A and B were fabricated in the same manner as in Example 1, except that natural rubber ("RSS No. 1", imported product of TOYOTSU CHEMIPLAS CORPORATION) instead of natural rubber having an epoxidation degree of 25% and 0.5 parts by mass of a crosslinking agent B (sulfur: trade name "Colloidal Sulfur A", manufactured by Tsurumi Chemical Industry Co., Ltd.) instead of the crosslinking agent A, were used, 1.5 parts by mass of a crosslinking accelerator A (N-cyclohexyl-2-benzothiazole sulfenamide: trade name "Noccela (registered trademark) CZ-G", manufactured by OUCHI SHINKO CHEMICAL CO., LTD.) and 1 part by mass of a crosslinking accelerator B (tetramethylthiuram disulfide: trade name "Noccela (registered trademark) TT-P", manufactured by OUCHI SHINKO CHEMICAL CO., LTD.) were further compounded, and when fabricating respective test pieces A and B, the crosslinking temperature was changed from 170° C. to 150° C., and then the above measurements were made. The results are shown in Table 1.

Comparative Example 2

A rubber composition and respective test pieces A and B were fabricated in the same manner as in Example 1, except that natural rubber ("RSS No. 1", imported product of TOYOTSU CHEMIPLAS CORPORATION) was used instead of natural rubber having an epoxidation degree of 25%, and then the above measurements were made. The results are shown in Table 1.

Comparative Example 3

A rubber composition and respective test pieces A and B were fabricated in the same manner as in Example 1, except that natural rubber ("ENR50", imported product of Sanyo Trading Co., Ltd.) having an epoxidation degree of 50% was used instead of natural rubber having an epoxidation degree of 25%, and then the above measurements were made. The results are shown in Table 1.

Comparative Example 4

A rubber composition and respective test pieces A and B were fabricated in the same manner as in Example 2, except that no silane coupling agent was compounded, and then the above measurements were made. The results are shown in Table 1.

TABLE 1

| | | Example 1 | Example 2 | Comparative Example 1 | Comparative Example 2 | Comparative Example 3 | Comparative Example 4 |
|---|---|---|---|---|---|---|---|
| Rubber composition | Natural rubber | | 100 | 100 | 100 | | 100 |
| | Natural rubber having a degree of epoxidation of 25% | 100 | | | | | |
| | Natural rubber having a degree of epoxidation of 50% | | | | | 100 | |
| | Filler A | 50 | | 50 | 50 | 50 | |
| | Filler B | | 50 | | | | 50 |
| | Crosslinking agent A | 2.5 | 2.5 | | 2.5 | 2.5 | 2.5 |
| | Crosslinking agent B | | | 0.5 | | | |
| | Silane coupling agent | | 1 | | | | |
| | Crosslinking accelerator A | | | 1.5 | | | |
| | Crosslinking accelerator B | | | 1 | | | |
| | Auxiliary agent A | 5 | 5 | 5 | 5 | 5 | 5 |
| | Auxillary agent B | 1 | 1 | 1 | 1 | 1 | 1 |
| | Anti-aging agent | 2 | 2 | 2 | 2 | 2 | 2 |
| Mechanical strength | Tensile strength [MPa] | 23.8 | 15.8 | 26.9 | 23.9 | 24.4 | 18.7 |
| | Elongation at break [%] | 309 | 389 | 504 | 300 | 314 | 453 |
| Resistance to compression set | Compression set [%] | 40 | 35 | 78 | 49 | 33 | 64 |
| Cold resistance | TR10 [° C.] | −41 | −61 | −60 | −60 | −19 | −61 |

Each component shown in Table 1 above is as follows. Incidentally, the values for each component in Table 1 above represent "parts by mass".

Natural rubber: Product name "RSS No. 1", imported product of TOYOTSU CHEMIPLAS CORPORATION Natural rubber having an epoxidation degree of 25% ("ENR25", imported product of Sanyo Trading Co., Ltd.)

Natural rubber having an epoxidation degree of 50% ("ENR50", imported product of Sanyo Trading Co., Ltd.)

Filler A: Carbon black (product name "Vulcan (registered trademark) 3L", manufactured by Cabot Japan K. K.)

Filler B: Silica (product name "Ultrasil (registered trademark) 360", manufactured by Evonik Japan Co., Ltd.)

Crosslinking agent A: Dicumyl peroxide (product name "Percumyl (registered trademark) D", manufactured by NOF Corporation)

Crosslinking agent B: Sulfur (product name: "Colloidal Sulfur A", manufactured by Tsurumi Chemical Industry Co., Ltd.)

Silane coupling agent: Mercapto group-containing silane coupling agent (product name: "KBM-803", manufactured by Shin-Etsu Chemical Co., Ltd.)

Auxiliary agent A: Zinc oxide (product name "Zinc Oxide", manufactured by Seido Chemical Industry Co., Ltd.)

Auxiliary agent B: Stearic acid (product name: "DTST", manufactured by Miyoshi Oil & Fat Co., Ltd.)

Anti-aging agent: 2,2,4-Trimethyl-1,2-dihydroquinoline polymer (product name: "Nocrac 224", manufactured by OUCHI SHINKO CHEMICAL CO., LTD.)

As can be found in Table 1, Examples 1 and 2 each exhibited the tensile strength of 10 MPa or more, the elongation at break of 200% or more, and the high mechanical strength even under high pressures. Also Examples 1 and 2 exhibited the temperature of TR10 in the low-temperature elastic recovery test of −40° C. or lower, and further the compression set at 100° C. with an elapsed time of 70 hours, of 40% or less, resulting in being excellent in the cold resistance in low temperature ranges and the resistance to compression set in high temperature ranges.

On the other hand, Comparative Example 1 in which the sulfur crosslinking agent was used as the crosslinking agent, exhibited the compression set of higher than 40%, indicating the poor resistance to compression set. Similarly, Comparative Example 2, in which carbon black was used as the filler and unmodified natural rubber was used as the natural rubber component, exhibited the compression set of higher than 40% and the poor resistance to compression set. On the other hand, Comparative Example 3, in which carbon black was used as the filler and natural rubber having an epoxidation degree of 50% was used as the natural rubber component, exhibited the compression set of 40% or less, but the TR10 temperature in the low-temperature elastic recovery test of higher than −40° C., indicating the poor cold resistance. Furthermore, Comparative Example 4, in which silica was used as the filler but no silane coupling agent was used, exhibited the compression set of higher than 40%, indicating the poor resistance to compression set.

The invention claimed is:

1. A sealing apparatus arranged between two members facing each other for sealing a space between the two members, wherein the sealing apparatus comprises a sealing body in contact with the space, and the sealing body is a vulcanized molded product of a rubber composition comprising (A) a natural rubber component selected from natural rubber and epoxy-modified natural rubber having an epoxidation degree of 1% or more and less than 50%, (B) a filler selected from carbon black and silica, (C) an organic peroxide-based crosslinking agent, and optionally (D) a silane coupling agent, provided that when the filler is carbon black, the rubber composition comprises epoxy-modified natural rubber having an epoxidation degree of 1% or more and less than 50%, and when the filler is silica, the rubber composition further comprises a silane coupling agent.

2. The sealing apparatus according to claim 1, wherein the sealing body is annular.

3. The sealing apparatus according to claim 1, wherein the sealing body is held by a backup ring.

4. The sealing apparatus according to claim 1, wherein a cross-sectional shape of the sealing body is a projecting shape.

5. The sealing apparatus according to claim 4, wherein the sealing body is arranged on a plate-like substrate, and the substrate is a plate made of metal or carbon.

6. The sealing apparatus according to claim 5, wherein the substrate and the sealing body are bonded by an adhesive comprised in the sealing body.

7. The sealing apparatus according to claim 1, wherein the sealing body is in contact with hydrogen gas.

8. The sealing apparatus according to claim 1, wherein the sealing body is in contact with liquid hydrogen.

9. The sealing apparatus according to claim 1, wherein the sealing apparatus is for use in a hydrogen energy system.

10. The sealing apparatus according to claim 1, wherein the rubber composition further comprises (E) at least one additive selected from the group consisting of a crosslinking accelerator, an auxiliary agent, and an anti-aging agent.

* * * * *